Feb. 8, 1955
C. A. E. JOHNSON
2,701,448
PNEUMATIC TURNOVER FOR GLASS MOLD CARRIERS
Filed Jan. 4, 1951
4 Sheets-Sheet 2
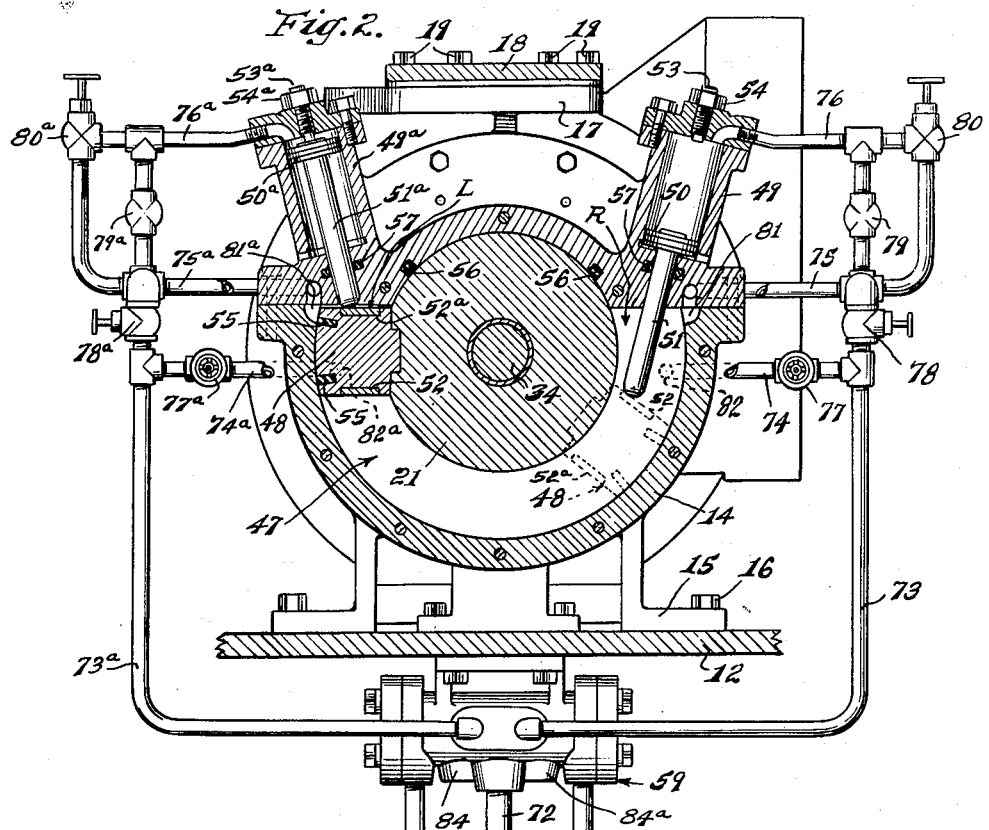
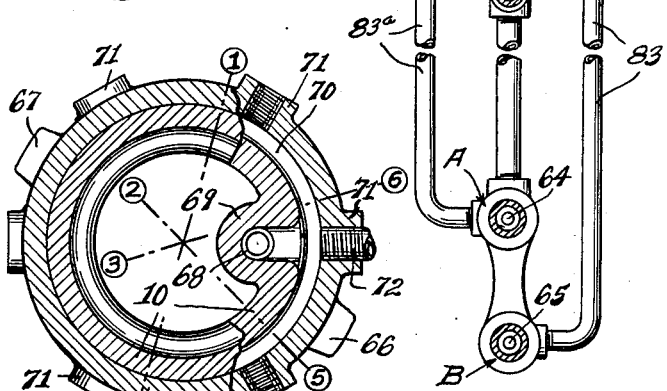
Inventor.
Charles A. E. Johnson.
By Bair, Freeman & Molinare
Attys.

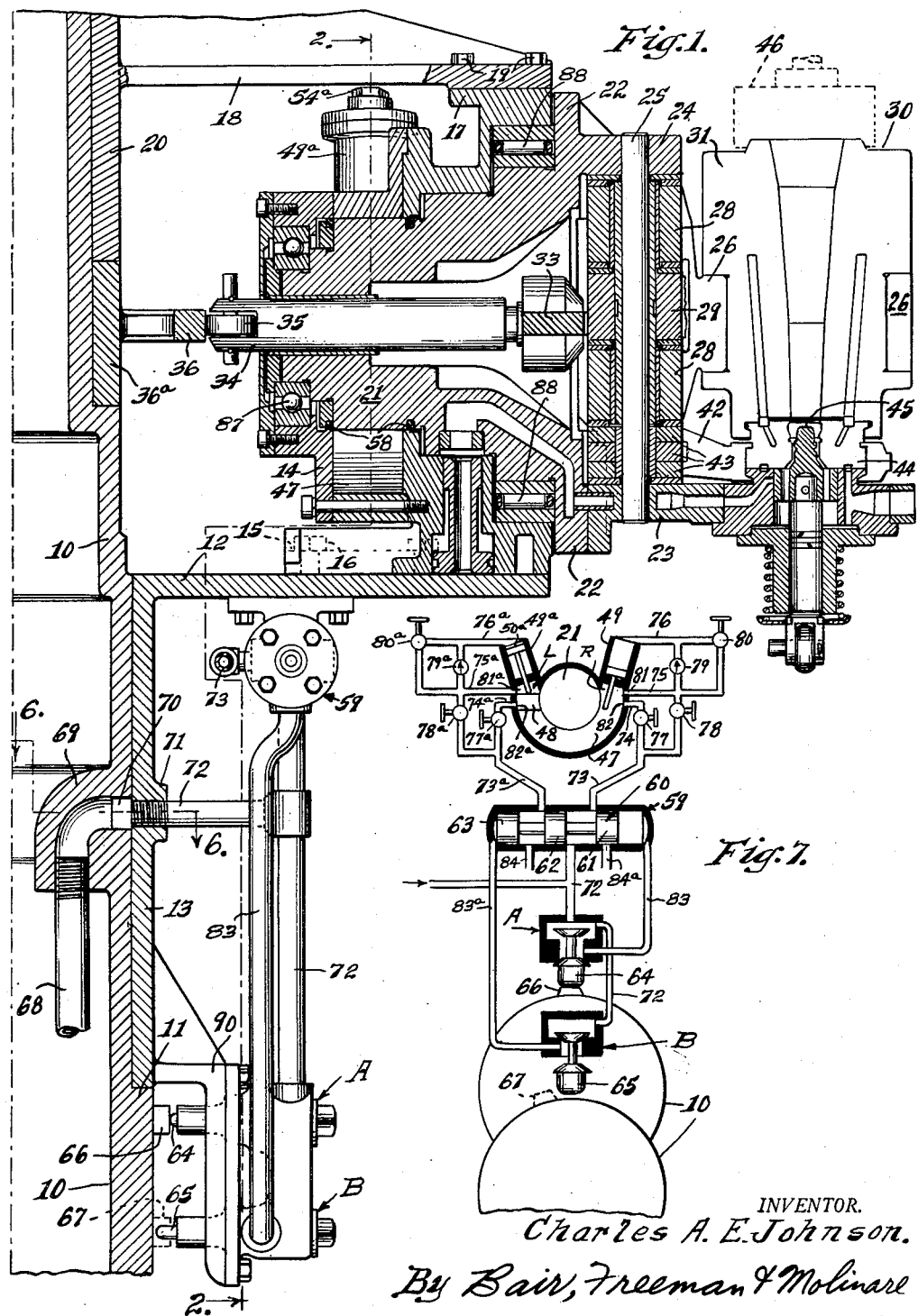

Feb. 8, 1955
C. A. E. JOHNSON
2,701,448
PNEUMATIC TURNOVER FOR GLASS MOLD CARRIERS
Filed Jan. 4, 1951
4 Sheets-Sheet 3
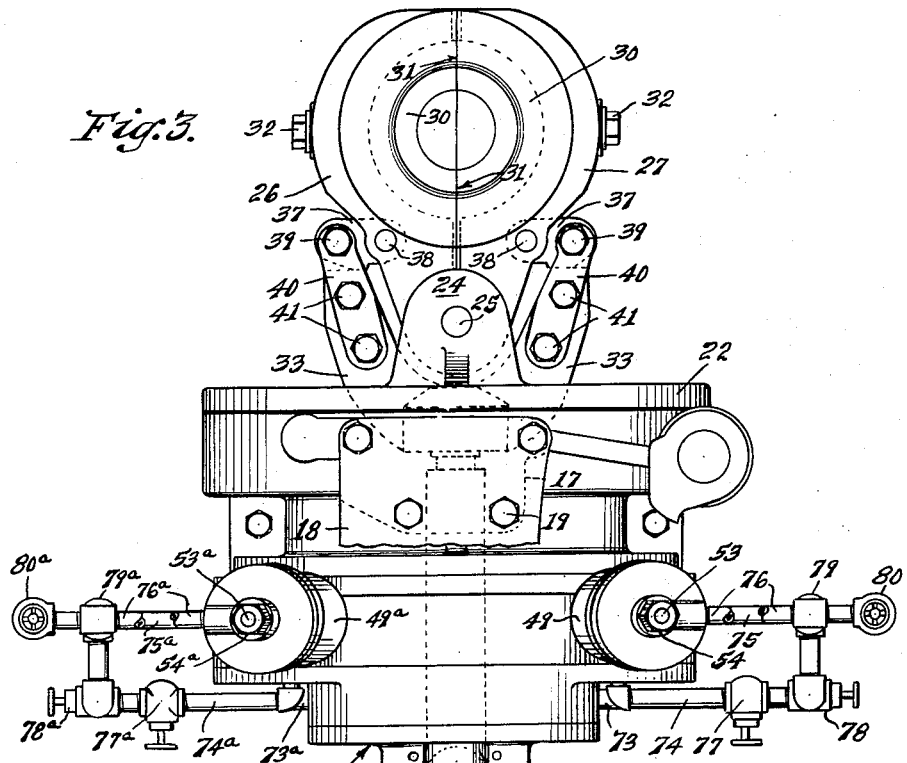
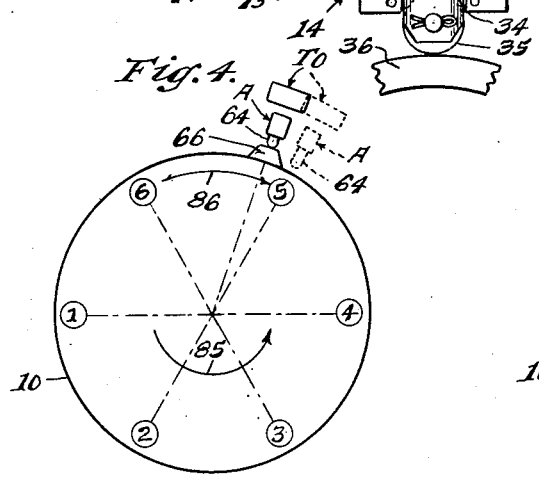
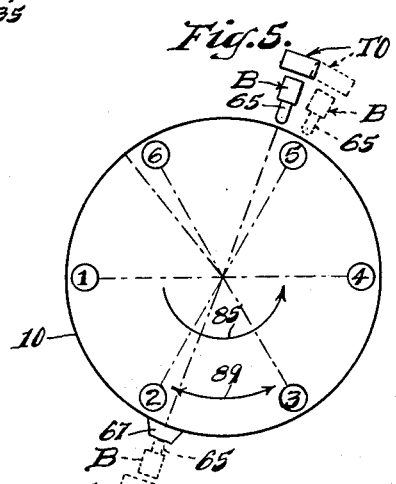
Inventor:
Charles A. E. Johnson.
By Bair, Freeman & Molinare
Att'ys.

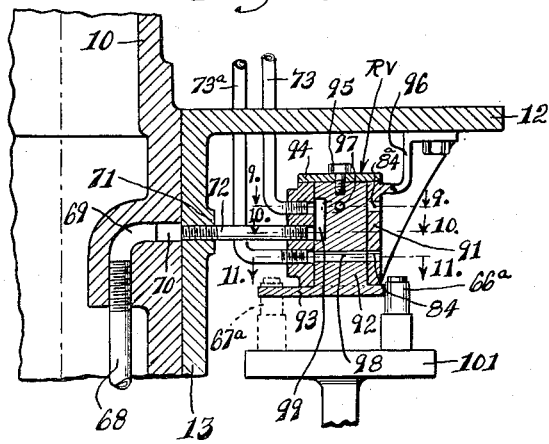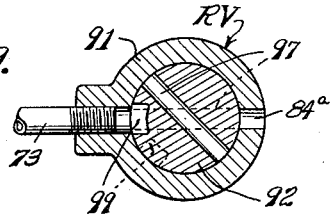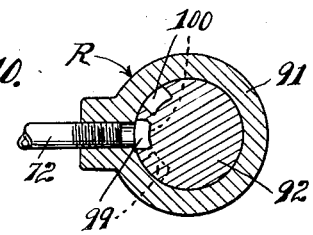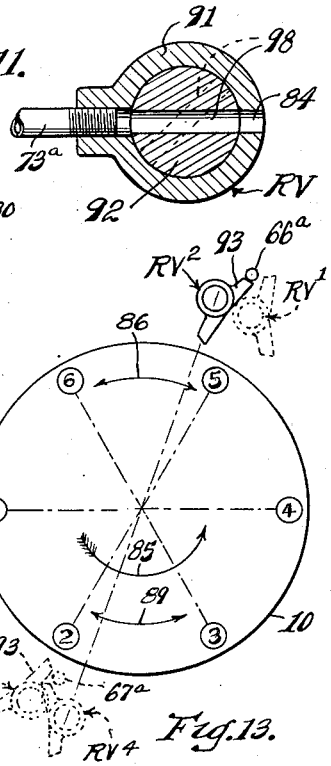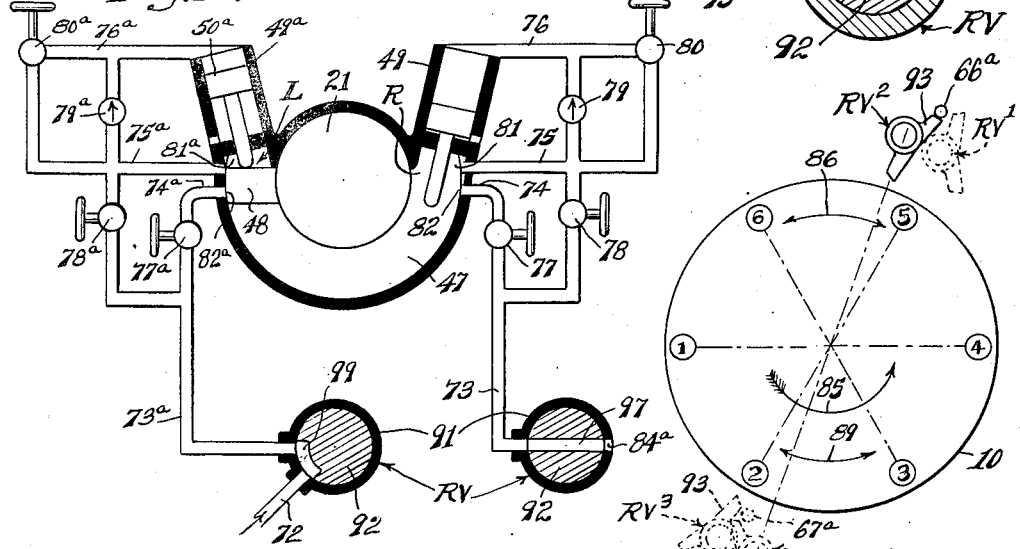
Inventor.
Charles A. E. Johnson.
By Bair, Freeman & Molinare
Attys.

United States Patent Office 2,701,448
Patented Feb. 8, 1955

2,701,448

PNEUMATIC TURNOVER FOR GLASS MOLD CARRIERS

Charles A. E. Johnson, Anderson, Ind., assignor to Lynch Corporation, Anderson, Ind., a corporation of Indiana Application January 4, 1951, Serial No. 204,392

9 Claims. (Cl. 60—97)

This invention relates to a turn-over device for the mold carriers of glass forming machines and particularly a turn-over which is pneumatically operated as distinguished from those which are mechanically operated.

One object of the invention is to provide a turn-over mechanism for glass mold carriers which is pneumatically operated for the purpose of providing turn-over operations which are relatively shockless to the parison due to the use of compressed air for performing these operations. Heretofore in the construction of glass forming machines, particularly of the type which blows bottles and the like into molds therefor, it has been customary to provide molds that are inverted for receiving a charge or gather of glass in a parison mold, blow the parison in the mold while inverted, and then turn the mold and the parison right-side-up for transfer to a finish blow table in which the finish molds receive the parisons right-side-up and blow the parison to the finished shape in this position. Each mold carrier on the parison blank table is mounted for rotation relative to the table itself so that they may invert the mold to receive the gather and turn the mold right-side-up again or "upright" it after the parison has been blown. Some means such as a bevel gear on the glass mold carrier and a sector of a beveled gear on the column around which the parison blank table rotates is usually provided as shown, for instance, in the Bridges patent, No. 2,069,130, of January 26, 1937.

Another object of the present invention is to improve upon the mechanical turn-over arrangement of the Bridges patent by providing a turn-over mechanism that is operated by compressed air, glass blowing machines of the general type shown in said patent being usually provided with other mechanisms operated by compressed air so that the compressed air is readily available for operation of a turn-over device that is of the pneumatic type.

Another object is to provide a pneumatic circuit for operating the turn-over mechanism which is properly controlled and timed by valves carried by the parison blank table and cooperating with stationary cams on the column about which the table rotates or on the base of the machine.

Still another object is to provide adjustable valves for controlling the flow of air to the pneumatic mechanism so that the speed of the turn-over stroke can be adjusted as desired.

A further object is to provide a combined booster and cushioning piston arrangement in the mechanism which boosts the beginning of the turn-over stroke and cushions the end thereof, thereby speeding up the action so that the turn-over will operate within a sufficiently short time to complete the turn-over operation in the allotted time permitted by the operation of the machine (which may vary anywhere from 20 to 60 cycles per minute) and at the same time cushion the stopping of the turn-over operation so that shock to the mechanism and thereby noise, and to shock the parison are reduced to a minimum.

Still a further object is to provide adjustable valves for controlling the cushioning effect.

An additional object is to provide a valving arrangement including a pneumatically operated spool valve which is controlled by an impulse valve so that when once the impulse valve is actuated, it will pneumatically throw the spool valve to the desired position and the spool valve will remain in that position until thrown to its opposite position by another impulse valve, thereby permitting initiation of the turn-over operation and insuring that the mold carrier will remain in inverted position until it is time to upright it and vice versa.

Another additional object is to provide a modified arrangement utilizing a rocker valve in place of the combination of pneumatically operated and impulse valves.

With these and other objects in view, my invention consists in the construction, arrangement and combination of the various parts of my pneumatic turn-over for glass mold carriers whereby the objects contemplated are attained, as hereinafter more fully set forth, pointed out in my claims and illustrated in the accompanying drawings, wherein:

Figure 1 is a vertical sectional view through a portion of the parison blow column and blow table of a glass forming machine and through my pneumatically operated glass mold carrier turn-over mechanism.

Figure 2 is a vertical sectional view on the line 2—2 of Figure 1 showing particularly a mold carrier barrel, the piston wing carried thereby in an arcuate cavity of the turn-over mechanism, and the valving and piping arrangement for the mechanism.

Figure 3 is a plan view of Figure 2.

Figure 4 is a diagrammatic view showing a cam for operating the turn-over device for inverting the mold carrier.

Figure 5 is a similar diagrammatic view showing the cam for uprighting the mold carrier.

Figure 6 is a sectional view on the line 6—6 of Figure 1 showing the air supply for the pneumatic turn-over mechanism.

Figure 7 is a pneumatic diagram following somewhat Figure 2 and showing the position of the parts as a result of operation of one of the impulse valves.

Figure 8 is a sectional view similar to a portion of Figure 1 showing a modified construction wherein a rocker valve is substituted for certain valves heretofore shown in Figures 1 to 7.

Figures 9, 10 and 11 are enlarged horizontal sectional views on the lines 9—9, 10—10, and 11—11 respectively of Figure 8.

Figure 12 is a diagram similar to Figure 7 of the pneumatic turn-over controlled by the rocker valve of Figure 8; and Figure 13 is a diagrammatic view similar to Figures 4 and 5 showing the camming arrangement for the rocker valve of Figure 8.

On the accompanying drawings I have used the reference numeral 10 to indicate a vertical column around which a parison blank table may rotate, the table being shown at 12 and being provided with a sleeve 13 rotatable on the column and supported by a shoulder 11 thereof. The general construction shown in Figure 1 is somewhat similar to that shown in the Bridges patent, No. 2,129,614 of September 6, 1938, the mechanical turn-over mechanism mounted on the table, however, being modified to include my present pneumatically operated type.

The turn-over mechanism includes a housing 14 having a base 15 secured as by screws 16 to the table 12. The housing 14 has a head 17 to which a bracket 18 is secured by screws 19. The bracket 18 has a sleeve 20 surrounding the column 10 and rotatable thereon so that the sleeve and bracket rotate with the table 12 and its sleeve 13.

The housing 14 is securely held in the proper position with respect to the parison blank table 12 by the base 15 and the bracket 18, and, as will appear later on in the specification, is one of a number of similar turn-over mechanisms supported on the table.

Within the housing 14 an oscillatable element or barrel 21 is mounted in ball bearings 87 and roller bearings 88. The element 21 carries on its outer end (the right hand end in Figure 1) a flange 22. The flange 22 has lower and upper ears 23 and 24 extending therefrom in which a pivot pin 25 is mounted.

Pivotally mounted on the pin 25 is a pair of mold carriers 26 and 27 which are C-shaped for receiving a parison mold. The mold carrier 26 has a pair of hubs 28 oscillatable on the pin 25 and the mold carrier 27 has a single hub 29 oscillatable thereon and located between the hubs 28, suitable bearing sleeves and thrust washers being provided as illustrated. The parison mold consists of a pair of mold halves 30 supported in the mold carriers 26 and 27 as by screws 32. The parting face between the molds is indicated at 31. Cooperating with the molds is a plate 46, the plate, however, being associated therewith only when the mold is at the proper station of the glass forming machine for blowing the parison.

A mold operating yoke 33 of U-shape is provided, which has a shaft-like extension 34 slidably mounted in the barrel 21 and terminating in a roller 35. The roller is adapted to be actuated for closing and opening the mold carriers by a cam 36 having a sleeve 36a secured to the column 10. The arms of the yoke 33 are provided with yoke extensions 40 bolted thereto as at 41 and links 37 are pivoted to the mold carriers and the extensions by pivot bolts 38 and 39 as disclosed more fully in the Bridges Patent No. 2,307,563 of January 5, 1943, wherein the operation thereof is disclosed in detail and forms no part of my present invention. The mold operating yoke is a necessary part of the glass forming machine, however, so it was necessary to design my pneumatic turn-over mechanism to accommodate it.

The usual glass forming machine further includes for each mold a pair of C-shaped neck mold carriers 42 which are somewhat similar to the mold carriers 26 and 27 but of less vertical extent and provided with hubs 43 oscillatable on the pivot pin 25. These are adapted to hold a split neck mold 44 and operate in conjunction with a neck forming plunger 45 and associated mechanism for closing the mold, including the neck thereof in such manner that certain passageways are left for the parison blowing operation. The air for this operation is discharged upwardly into the mold and forms the parison upwardly against the plate 46 in a manner well known in the glass blowing art.

Within the housing 14 an arcuate cavity 47 is provided which, as shown in Figure 2, has left and right ends designated L and R respectively. The barrel 21 has a piston wing 48 extending radially therefrom and substantially filling the radial cross section of the cavity 47 for the purpose of imparting oscillations to the barrel 21 upon the proper introduction of compressed air into the ends of the cavity as will hereinafter appear. In conjunction with the wing 48, I provide a cylinder 49 for the R end of the cavity 47 which may be part of the housing 14 and within the cylinder I provide a combination booster and cushioning piston 50.

A stem 51 extends from the piston 50 into the right end R of the arcuate cavity 47 and is adapted to coact with a wear pad 52 of hardened metal secured to the piston wing 48. A stop screw 53 is provided in the cylinder 49 for the piston 50 at its upper limit of movement and after the screws are adjusted, the adjustment is retained by a lock nut 54.

For the left end L of the arcuate cavity 47, I provide a similar booster and cushioning arrangement bearing the reference numerals 49a to 54a.

Suitable packing bars 55 and 56 are provided for the wing 48 and the barrel 21 and O-rings 57 are provided for the piston stems 51 and 51a to prevent undesirable leakage of the air used for operating the turn-over mechanism. Angular packing rings 58 may also be provided as shown in Figure 1 for the barrel 21 to prevent undesirable leakage beyond the portion thereof communicating with the cavity 47. Since these packings are well known, I will not go into detail with respect to their construction.

For controlling the flow of air to the arcuate cavity 47 and to the cylinders 49, I provide a pneumatically operated valve 59 of "spool" type wherein the spool is indicated generally at 60 and is provided with three lands 61, 62 and 63. An inverting valve A and an uprighting valve B are pneumatically associated with the spool valve 59 for effecting the desired automatic control of the turn-over mechanism. The valves A and B are three-way impulse valves adapted to momentarily supply air to the right and left ends respectively of the spool valve 59 as shown in the pneumatic diagram of Figure 7. The valves A and B are mounted on a bracket 90 extending from the sleeve 13 and are provided with valve plungers 64 and 65 respectively adapted to coact with separate cam lobes 66 and 67 mounted on the column 10.

An air main 68 supplies compressed air to the column 10 for distribution to the plurality of pneumatic turn-over mechanisms (six being disclosed in Figures 4 and 5 as hereinafter referred to) mounted on the parison blow table 12. This main is connected inside the column to a boss 69 thereof which boss communicates with an annular groove 70 around the column so that the air may be supplied to the table 12 as it rotates. Bosses 71 are provided on the sleeve 13, one for each turn-over mechanism, and air mains 72 extend from these bosses to the spool valves 59 and to the inverting and uprighting valves for supplying air constantly thereto.

Referring particularly to the diagrammatic view, Figure 7, a pipe 73 leads from the spool valve 59 to the turnover mechanism. It branches off at 74, 75 and 76 to a secondary port 82, a primary port 81 and the cylinder 49 respectively. Interposed in the pipe 74 is a speed control valve 77. Ahead of the pipes 75 and 76 is a starting control valve 78, a check valve 79 being interposed between this valve and the pipe 76 and opening toward the pipe 76. Interposed between the valve 78 and the pipe 76 is a cushioning control valve 80.

The pneumatic circuit is completed for the R end of the arcuate cavity 47 by an inverting control line 83 connecting the inverting valve A to the spool valve 59, and the spool valve is provided with an inverting exhaust port 84. The parts 73 to 84 have their counterpart for the L end of the arcuate cavity 47, which are designated by the same reference numerals followed by "a." The control line 83a, however, is an uprighting control line and the exhaust port 84a is an uprighting exhaust port.

Referring to Figures 4 and 5, a diagram is shown in which the large circle indicates the outline of the column 10 and is so numbered. Stations (1) to (6) are shown, the numbers being enclosed in small circles and there being a turn-over mechanism TO at each station but the one at station (5) only being shown in Figure 4. In Figure 5 this same turn-over mechanism TO is shown adjacent station (2), having rotated thereto from the Figure 4 position. While these stations may differ in position and/or function in various types of glass-forming machinery, that type which receives the charge or gather of glass in the bottom of the parison mold so that it settles against a neck forming plunger and the parison is then blown in the inverted position after a plate is engaged with the inverted bottom of the mold will be described as representative of a machine to which my pneumatic turn-over mechanism for glass mold carriers is adaptable.

In such a machine, the gather of glass may be introduced at station (1) and the parison blown at station (2). Transfer then takes place at station (4), that is, the transfer of the parison from the parison blank table to a finish blow mold on the finish blow table. No attempt has been made to illustrate the finish blow table as it does not enter into consideration as far as the present invention is concerned, both Figures 4 and 5 representing the parison blank table only, the molds being right-side-up at the transfer station (4) but it being desirable to charge them while inverted.

Between stations (5) and (6), (the direction of rotation being counter-clockwise as indicated by the arrow 85), it is desirable to invert the glass mold carrier as indicated for instance by the arc 86. Accordingly, the cam lobe 66 is located just past station (5) in order to invert the mold by the time it reaches station (6) and thus ready the mold for being charged with a gob of glass at station (1).

It is desirable to start blowing the parison about half way between station (1) and station (2) and continue blowing until the start of the uprighting operation. The mold is uprighted during the blank table travel indicated for instance by the arc 89 in Figure 5, the cam lobe 67 being located just past station (2) as shown for this purpose.

In Figures 8 to 13, I show a rocker valve indicated generally at RV to take the place of the spool valve 59 and the impulse valves A and B of Figures 1 to 7. The rocker valve comprises a cylindrical housing 91 in which a valve plug 92 is oscillatably mounted. The lower end of the valve plug is provided with a rocker 93 and the plug is held in the body 91 by an end plate 94 and a cap screw 95. The valve housing 91 is mounted on the blank table 12 by means of a bracket foot 96 secured thereto.

The housing 91 has the air main 72 and the pipes 73 and 73a entering one side thereof at three different levels as shown in Figure 8. It also has exhaust ports 84 and 84a for the pipes 73a and 73 respectively, the same as the spool valve 59 in Figure 7. These ports have accordingly been given the same reference numerals.

The valve plug is provided with a pair of through ports 97 and 98 and with a pair of connecting ports 99 and 100 for connecting the pipes 72 and 73 together and the pipes 72a and 73a respectively.

For operating the rocker valve RV, I provide a pair of rollers 66a and 67a corresponding to the cam lobes 66 and 67. These are located substantially 180° apart for rocking the valve RV in one direction just after station (5) is passed and rocking it back in the other direction just after station (2) is passed as shown in Figure 13.

Practical operation

In the operation of my pneumatic turn-over mechanism, assuming that one of the six turn-over devices TO (shown by dotted lines in Figures 4 and 5) has reached station (5), the rotation of the table 12 is stopped, the table being driven by a Geneva movement or pneumatic indexing mechanism of suitable character. The inverting valve A and likewise the uprighting valve B will also be at station (5) as indicated by dotted lines in Figures 4 and 5 respectively.

Soon after the table starts to move again, the valves will assume the position shown by the solid line valve A in Figure 4 and likewise the valve B in Figure 5 will be at this same angular position. The valve A has just been opened by the cam 66 but the valve B being out of line with the cam 66 will not be affected. The valve A being in the open position shown in Figure 7 will permit the compressed air from the main 72 to flow through the inverting control line 83 to the right hand end of the spool valve 59 for shifting the spool to the left which assumed position is illustrated in Figure 7.

This will result in air from the main 72 passing between the lands 61 and 62 to the pipe 73 for distribution to the pipes 74, 75 and 76. The air flows from the port 81 into the R end of the cavity 47 back of the piston wing 48 which at that time would be swung to the right instead of to the left as shown in Figures 2 and 7, the position shown being after the inverting operation has taken place, and Figure 1 also illustrating the inverted position to illustrate structural relations rather than proper timing. Figure 1 also illustrates the cam 66 out of place circumferentially of the column 10 in order to show the valve A opened by the cam.

The air introduced through the port 81 will drive the oscillatable element or barrel 21 clockwise and the beginning of the oscillation will be aided by the piston 50 which, at that time, acts as a booster, its stem 51 pressing against the wear pad 52 to get the barrel 21 quickly started in a clockwise direction. The barrel 21 is thus started by the introduction of air through the primary port 81 and boosted by air to the cylinder 49. Just before the booster effect is terminated by the piston 50 reaching its lower limit of movement, the secondary port 82 is uncovered by the piston wing 48 so that additional air is introduced for speeding up the travel of the piston wing to minimize the time required for its complete travel. In the description thus far, I have omitted reference to the operation of the valves 77, 78, 79 and 80 but they will be referred to later.

During the clockwise rotation of the barrel 21, the compressed air previously in the L end of the cavity 47 is released to atmosphere through the pipes 74a, 75a and 73a, this air passing between the lands 62 and 63 of the spool valve 59 to the inverting exhaust port 84. Just before cut-off at the port 82a occurs, the wear pad 52a engages the stem 51a and the movement of the wing 48 and the barrel 21 is thereby slowed down and cushioned by the air in the cylinder 49a above the piston 50a passing through the pipes 76a and 73a to the spool valve 59 for exhaust to atmosphere as just described.

The spool of the spool valve, once it is thrown to the position shown in Figure 7 by a momentary opening of the inverting valve A, will remain in that position and the valve A may reclose for shutting off air from the main 72 to the inverting control line 83. At the same time the exhaust side of the valve A is opened to atmosphere so that the compressed air in the right hand end of the spool valve 59 will exhaust to atmosphere through the line 83.

The spool valve remaining in the position just referred to will keep the line open from the main 72 to the ports 81 and 82 thus keeping the right hand end of the cavity 47 charged with compressed air to retain the barrel 21 in the position shown in Figures 1 and 2 with the mold inverted while it remains at the charging station (1) and during the time that it travels from the charging station until the time it starts uprighting between stations (2) and (3). The stop screw 53a is adjusted so that through the piston 50a and the stem 51a it will accurately locate the piston wing 48 for an exact vertical alignment of the parison mold 30.

When the table 12 starts to rotate after the turn-over device TO has stopped at station (2), the uprighting valve B will reach the dotted position shown in Figure 5 where it is opened by the cam lobe 67, thus shifting the spool of the valve 59 to the right for opening the main 72 to the pipe 73a and the L end of the cavity 47, and exhausting air from the R end thereof through the pipe 73 and the uprighting exhaust port 84a to atmosphere. The piston 50a then acts as a booster piston and the wing 48 travels counter-clockwise to the dotted position shown in Figure 2 where the wear pad 52 engages the stem 51 after which the piston 50 acts as a cushioning piston for the turn-over mechanism during the uprighting cycle thereof. The stop screw 53 functions to limit the counter-clockwise motion of the wing 48 so that the parison mold 30 will be exactly in a vertical upright position by the time the pneumatic turn-over TO under consideration reaches station (3). The reversed position of the spool valve will continue the air pressure through the ports 81a and 82a to insure that the barrel 21 will remain at its counter-clockwise limit of oscillation past the transfer station (4) and past station (5) until the inverting valve A is opened again thus completing a cycle of operation for the parison mold.

The timing of the inverting operation represented by the length of the arc 86 in Figure 4 may be varied as desired by proper adjustment of the valves 77 and 78 and likewise the arc 89 may be varied by the proper adjustment of the valves 77a and 78a. The valves 77 and 78 are used to choke down the flow of compressed air so as to secure as long a time as possible for the inverting oscillating stroke of the piston wing 48 yet assure that the stroke will be completed by the time the parison mold reaches station (6). Likewise during the uprighting stroke of oscillation, it is desirable to complete the stroke before station (3) is reached as indicated in Figure 5.

The adjustment of the valve 78 controls both the speed of admission of compressed air to the port 81 and to the cylinder 49, the air passing freely through the check valve 79. Thus the starting and boosting operation may be nicely adjusted as desired. The valve 77 is then adjusted for increasing or decreasing the speed of travel of the piston wing 48 between the time the port 82 is opened and the time that the piston wing engages the stem 51a for the cushioning action.

The cushioning action is controlled by the adjustment of the cushioning control valve 80a through which the air exhausted from the cylinder 49a must pass as it is blocked by the check valve 79a from going through the valve 78a only. The valve 80a, of course, is adjusted to a smaller opening than the valve 78a unless the adjustment of the valve 78a is such that the desired cushioning is had without further choking the flow of air from the cylinder 49a to the inverting exhaust port 84 of the spool valve. In the reverse direction it is obvious how the valves are similarly adjusted for securing the desired results as to speed of travel in relation to an indexing operation of the parison blow table and the cushioning effect at the end of the uprighting operation.

In the operation of the rocker valve arrangement shown in Figures 8 to 13, the rocker valve is shown in four different positions in Figures 13 designated RV1, RV2, RV3 and RV4. At RV1 (station (5)) the rocker valve is in a position opposite that shown in Figure 8, this same position being shown dotted in Figures 9, 10 and 11. The blank table is stationary at this time and soon after it starts to move, the roller 66a is engaged by the outer wing of the rocker 93 and the rocker valve is rotated clockwise to the position shown in solid lines which position corresponds to that shown in Figure 8 and by solid lines in Figures 9, 10 and 11 and introduces compressed air from 72 through 99 to 73 for rotating the barrel 21 clockwise to the position shown in Figure 12, the same as described in connection with Figure 7.

When station (2) is reached by the rocker valve as indicated at RV3, the inner wing of the rocker 93 is about ready to engage the roller 67a. When it does engage that roller due to rotation of the blank table 12, the rocker will be reversed in position and the rocker valve will then assume the position shown by dotted lines as at RV4 and remain in that position until the position RV1 is reached to complete the cycle. During this half of rotation, the valve plug 92 will be in a position rotated counterclockwise from the solid line position of Figures 9, 10 and 11 to the dotted positions shown therein which is the same position as illustrated in Figure 12 with the air from 72 through 99 to 73a for rotating the barrel 21 counterclockwise from the position shown and the exhaust being through 73, 97 and 84a.

As in Figures 4 and 5, the rocker valve effects turn-over of the barrel 21 and the mold carrier 26 between stations (5) and (6) as indicated by the arrows 86, and uprighting thereof between stations (2) and (3) as indicated by the arrow 89.

Having described certain embodiments of my invention, it is obvious that I have provided a construction which will accomplish the objects sought and is an improvement over mechanical arrangements such as bevel gears and sectors for inverting and uprighting a turn-over mechanism as a result of rotation of the parison blank table itself. Being pneumatically operated, the turn-over mechanism does not throw an additional load on the operating mechanism for the parison blank table as when bevel gear type turn-overs are provided.

The pneumatic means for starting and for boosting the start of the turn-over operation has mass and therefore inertia and also the build-up of air pressure is not instantaneous so that the turn-over operation is started without shock to the mechanism or to the parison after it is received in the mold and blown. Likewise the end of the turn-over stroke is pneumatically cushioned to prevent shock to mechanism and the parison at the end of the uprighting stroke. Minimum shock during operation is particularly desirable between stations (2) and (3) because the parison is in the mold at that time and has been blown. It is therefore undesirable to impart such shocks to it as will deform it or as will check the formed neck finish while the parison is still in plastic state.

The control valve arrangement 77—78—79—80 provides for individual control of each turn-over mechanism and likewise control of the inverting and uprighting operations independently of each other. They also provide for slow or fast operation of the turn-over devices to correspond to slow or fast operation of the parison blow table as when small articles are blown and the table is speeded up, the turn-over operations can likewise be speeded up by proper opening of the valves. Conversely, when large articles are blown and the table speed is decreased, the timing of the turn-over operations can likewise be decreased by closing the valves down.

I have thus provided a turn-over mechanism having the advantage of pneumatic operation for minimizing shock to the parison and have arranged the controls for it so that it is fully adjustable for all types of glass blowing operations capable of being performed in the machine, machines of this character being usually adaptable for a wide variety of glassware from very small bottles of ounce or fractional ounce capacity up to gallon jugs and the like. Accordingly, the cycling speed of the machine may be varied as much as two or three to one and the turn-over mechanisms can be appropriately adjusted by the simple expedient of opening up or closing down the valves as required. For this purpose, the valves may be calibrated if found desirable.

Some changes may be made in the construction and arrangement of the parts of my pneumatic turn-over for glass mold carriers without departing from the real spirit and purpose of my inveniton, and it is my intention to cover by my claims any modified forms of structure or use of mechanical equivalents which may be reasonably included within their scope.

I claim as my invention:

1. In a pneumatic turn-over, a housing, an element oscillatable in said housing, said housing having an arcuate cavity, a piston wing projecting from said element into said cavity and oscillatable therein between the ends thereof, ports for admitting compressed air to the ends of said cavity, valve means for admitting compressed air to one end of said cavity while permitting its escape from the other end thereof to oscillate said element in the opposite direction and for admitting compressed air to said other end of said cavity while permitting its escape from the first end thereof to oscillate said element in the opposite direction, combined pneumatic booster and cushioning means adjacent the ends of said cavity for boosting the start of said piston wing and for cushioning the end of the oscillating movement thereof, and means for admitting compressed air also to one of said booster and cushioning means at the beginning of the oscillation and for exhausting air from the other at the end of such oscillation.

2. In a pneumatic turn-over, a housing, an element oscillatable in said housing, said housing having an arcuate cavity, a piston wing projecting from said element into said cavity and oscillatable therein between the ends thereof, ports for admitting compressed air to the ends of said cavity, valve means for admitting compressed air to one end of said cavity while permitting its escape from the other end thereof to oscillate said element in one direction and for admitting compressed air to said other end of said cavity while permitting its escape from the first end thereof to oscillate said element in the opposite direction, combined pneumatic booster and cushioning means adjacent the ends of said cavity for boosting the start of said piston wing and cushioning the end of its movement, means for admitting compressed air also to said booster and cushioning means at the beginning of the oscillation, control valves in the lines to said booster and cushioning means to adjust the boosting effect, and control valves in the lines to said booster and cushioning means to adjust the cushioning effect thereof on the piston wing.

3. In a pneumatic turn-over, a housing, an element oscillatable in said housing, said housing having an arcuate cavity, a piston wing projecting from said element into said cavity and oscillatable therein between the ends thereof, said housing having primary ports for admitting compressed air to the ends of said cavity, valve means for admitting compressed air to one of said primary ports while permitting its escape from the other primary port to oscillate said element in one direction and for admitting compressed air to said other primary port while permitting its escape from the first primary port to oscillate said element in the opposite direction, said housing having secondary ports for admitting compressed air to said cavity at positions spaced from the ends thereof, said valve means also controlling the flow of air to said secondary ports, boosting and cushioning pistons adjacent the ends of said cavity to boost and cushion opposite ends of the oscillating movement of said piston wing, and means for exhausting air from said boosting and cushioning pistons including valves for adjusting the cushioning effect.

4. In a pneumatic turn-over, a housing, an element oscillatable in said housing, said housing having an arcuate cavity, a piston wing projecting from said element into said cavity and oscillatable therein between the ends thereof, ports for admitting compressed air to the ends of said cavity, valve means for admitting compressed air to one end of said cavity while permitting its escape from the other end thereof to oscillate said element in one direction and for admitting compressed air to said other end of said cavity while permitting its escape from the first end thereof to oscillate said element in the opposite direction, cam means for operating said valve means, boosting and cushioning pistons adjacent the ends of said cavity to boost and cushion the opposite ends of the oscillating movement of said piston wing, and means for admitting air to and exhausting air from the boosting and cushioning pistons at the ends of such oscillation, said last means including valves for adjusting the cushioning effect.

5. In a pneumatic turn-over, a housing, an element oscillatable in said housing, said housing having an arcuate cavity, a piston wing projecting from said element into said cavity and oscillatable therein between the ends thereof, ports for admitting compressed air to the ends of said cavity, a pneumatically operated valve for admitting compressed air to one end of said cavity while permitting its escape from the other end thereof to oscillate said element in one direction and for admitting compressed air to said other end of said cavity while permitting its escape from the first end thereof to oscillate said element in the opposite direction in two opposite positions of said pneumatically operated valve, cam controlled valve means for controlling the shifting of said pneumatically operated valve to its opposite positions, cams for controlling said valve means, said cams and valve means being relatively movable, pistons adjacent the ends of said cavity for boosting the start of said piston wing, said pistons also cushioning the ends of the oscillating movement of said piston wing, means for admitting compressed air also to said pistons at the beginning of the oscillation and for exhausting air therefrom at the end of such oscillation, said last means including valves for adjusting the cushioning effect.

6. In a pneumatic turn-over, a housing, an element oscillatable in said housing, said housing having an arcuate cavity, a piston wing projecting from said element into said cavity and oscillatable therein between the ends thereof, ports for admitting compressed air to the ends of said cavity, pneumatically operated valve means mounted on and carried by the table for admitting compressed air to one end of said cavity while permitting its escape from the other end thereof to oscillate said element in one direction and for admitting compressed air to said other end of said cavity while permitting its escape from the first end thereof to oscillate said element in the opposite direction in two opposite positions of said pneumatically operated valve means, control valve means for shifting said pneumatically operated valve means to its opposite positions, cam means for operating said control valve means, pistons adjacent the ends of said cavity for boosting the start and for cushioning the ends of the oscillating movements of said piston wing, and means for admitting compressed air to said pistons at the beginning and for exhausting air therefrom at the ends of such oscillation.

7. A pneumatic turn-over comprising a housing, a winged element therein, said housing having an arcuate cavity, said element being oscillatable therein with its wing traveling between the ends of said cavity, ports for admitting compressed air to opposite ends of said cavity, rocker valve means for admitting compressed air to one end of said cavity while permitting its escape from the other end thereof to oscillate said element in one direction and for admitting compressed air to said other end of said cavity while permitting its escape from the first end thereof to oscillate said element in the opposite direction in two opposite positions of said valve means, said valve means, when once operated to either of said opposite positions remaining there until shifted to the other of said opposite positions, camming means for shifting said rocker valve means to its opposite positions, said camming means and said rocker valve means being relatively movable, and booster and cushioning pistons adjacent the ends of said cavity for boosting the start of the oscillating movement of said piston wing and for cushioning the end of its movement, said valve means also admitting compressed air to said booster and cushioning pistons.

8. A pneumatic turn-over comprising a housing, a winged element therein, said housing having an arcuate cavity, said element being oscillatable therein with its wing traveling between the ends of said cavity, ports for admitting compressed air to opposite ends of said cavity, valve means for admitting compressed air to one end of said cavity while permitting its escape from the other end thereof to oscillate said element in one direction and for admitting compressed air to said other end of said cavity while permitting its escape from the first end thereof to oscillate said element in the opposite direction in two opposite positions of said valve means, said valve means, when once operated to either of said opposite positions remaining there until shifted to the other of said opposite positions, cam means for shifting said valve means to its opposite positions, said cam means and said valve means being relatively movable, pistons adjacent the ends of said cavity for boosting the start of said piston wing and for cushioning the end of the oscillating movement thereof, and control valve means for the ends of said cavity to adjust the speed of oscillation of said piston wing.

9. A pneumatic turn-over comprising a housing, a winged element therein, said housing having an arcuate cavity, said element being oscillatable therein with its wing traveling between the ends of said cavity, ports for admitting compressed air to opposite ends of said cavity, valve means for admitting compressed air to one end of said cavity while permitting its escape from the other end thereof to oscillate said element in one direction and for admitting compressed air to said other end of said cavity while permitting its escape from the first end thereof to oscillate said element in the opposite direction in two opposite positions of said valve means, said valve means, when once operated to either of said opposite positions remaining there until shifted to the other of said opposite positions, cam means for shifting said valve means to its opposite positions, said cam means and said valve means being relatively movable, pistons adjacent the ends of said cavity for boosting the start of said piston wing and for cushioning the end of the oscillating movement thereof, control valve means for the ends of said cavity to adjust the speed of oscillation of said piston wing, and control valve means for said pistons to adjust the cushioning effect thereof.

References Cited in the file of this patent

UNITED STATES PATENTS

| Number | Name | Date |
|---|---|---|
| 840,877 | Steedman | Jan. 8, 1907 |
| 1,178,695 | Yost | Apr. 11, 1916 |
| 1,306,863 | Stickel | June 17, 1919 |
| 1,443,694 | McKechnie | Jan. 30, 1923 |
| 1,694,867 | Samuelson | Dec. 11, 1928 |
| 1,799,112 | Miedbrodt | Mar. 31, 1931 |
| 1,905,065 | Scholl | Apr. 25, 1933 |
| 1,919,177 | Soubier | July 18, 1933 |
| 1,931,375 | Cook et al. | Oct. 17, 1933 |
| 1,995,653 | Rowe | Mar. 26, 1935 |
| 2,019,766 | Peterson | Nov. 5, 1935 |
| 2,051,137 | Galleher | Aug. 18, 1936 |
| 2,129,614 | Bridges | Sept. 6, 1938 |
| 2,157,240 | Keel | May 9, 1939 |
| 2,320,373 | Meyer | June 1, 1943 |
| 2,350,066 | Parker | May 30, 1944 |
| 2,404,262 | Whitfield | July 16, 1946 |
| 2,459,475 | Almelo | Jan. 18, 1949 |
| 2,489,326 | Rockstrom et al. | Nov. 29, 1949 |